(12) United States Patent
Brunt et al.

(10) Patent No.: US 7,054,794 B2
(45) Date of Patent: *May 30, 2006

(54) COLOR VISUALISATION SYSTEM

(76) Inventors: Richard David Brunt, Lynton, Mossy Vale, Maidenhead, Berks, SL6 7RX (GB); Andrew Goderey, Ratcliff, 1, Clappers Meadow, Maidenhead, Berks, Sl6 8TT (GB); Christopher Harris, Long House, Alleyns Lane, Cookham, Berks, SL6 9AD (GB)

( * ) Notice: Subject to any disclaimer, the term of this patent is extended or adjusted under 35 U.S.C. 154(b) by 881 days.

This patent is subject to a terminal disclaimer.

(21) Appl. No.: 09/899,587

(22) Filed: Jul. 5, 2001

(65) Prior Publication Data

US 2001/0049592 A1 Dec. 6, 2001

Related U.S. Application Data

(63) Continuation-in-part of application No. 09/776,260, filed on Feb. 5, 2001.

(30) Foreign Application Priority Data

Jun. 1, 2000 (GB) .................................. 0013164.9

(51) Int. Cl.
G06F 17/50 (2006.01)

(52) U.S. Cl. ........................................... 703/1; 434/72

(58) Field of Classification Search .................... 703/1, 703/2; 434/78–79, 72
See application file for complete search history.

(56) References Cited

U.S. PATENT DOCUMENTS

| 6,524,107 | B1 * | 2/2003 | Brown .......................... 434/72 |
| 2001/0047250 | A1 * | 11/2001 | Schuller et al. ................. 703/1 |
| 2001/0049591 | A1 * | 12/2001 | Brunt et al. .................... 703/1 |

FOREIGN PATENT DOCUMENTS

| EP | 0 468126 A1 | 1/1992 |
| EP | 0794517 A2 | 9/1997 |
| FR | 2 702 291 A1 | 9/1994 |
| WO | WO 98 47105 A1 | 10/1998 |
| WO | WO 00 17818 A1 | 3/2000 |

* cited by examiner

Primary Examiner—Russell Frejd

(57) ABSTRACT

A method for producing a color recommendation for at least a part of a structure to be painted which comprises the steps of: selecting, at a user terminal and from a first database on a remote server containing at least one image of structural archetypes stored in electronic format on a storage device, an archetype image that closely matches the structure to be painted, selecting, at the user terminal, a color(s) from a second database located at the remote server containing at least one color stored in electronic format on storage device; applying the color(s) at the remote server to the image to produce a color scheme; displaying, on a display unit of the user terminal, of the at least part of a structure with the color applied; and providing information from which paint corresponding to the color(s) in the color scheme can be identified.

30 Claims, 1 Drawing Sheet

COLOR VISUALISATION SYSTEM

CROSS-REFERENCE TO RELATED APPLICATION

This is a continuation in part of copending application Ser. No. 09/776,260 filed Feb. 5, 2001.

BACKGROUND OF THE INVENTION

This invention relates to a method for producing colour recommendations for painting a structure or part of a structure for example the interior or exterior of a building, a motor vehicle, mobile home or ship.

The difficulty in selecting colours or colour schemes for structures described above is visualising the appearance of the structure when painted in a particular colour scheme. Generally colour schemes are designed from colour charts and paint swatches provided by paint companies. The problem is that such colour charts and swatches are relatively small in relation to the structure or part of a structure as a whole and so prevent an accurate impression being obtained of the finished work.

We have now found that colour schemes can be produced more satisfactorily, and therefore will give more acceptable results particularly to DIY consumers when it is possible to see at least approximately how the whole of a structure or part of a structure will appear when a colour scheme has been applied to it.

WO 98/47106 describes a method and associated apparatus for showing a scene incorporating a number of objects, such as items of furniture. A surface finish selector is also provided to enable a user to select a surface finish. This surface finish is downloaded from a remote source and is mapped onto the object in the 3D scene. The mapping of the surface finish is performed locally.

Local mapping requires a great deal of local system resources to be allocated to the task. This is undesirable as the local system will have reduced performance. Initially the user starts with a scene that can be constructed locally, or previously downloaded from a remote source. The scene however has to have items of furniture inserted by the user. This can take quite some time for a user, especially as the local system has reduced performance due to the local mapping.

The resultant image, being built up using discrete structural and furnishing archetypes, can be made to look structurally similar to a users room, but suffers from a lack of realism in the graphics of the displayed image.

FR 2 702 291 describes a process of simulating a repetitive pattern on a digital image. There is described a catalogue of repetitive patterns and images of rooms stored locally at the terminal. A user accesses the catalogue of images and highlights the areas where a pattern is to be applied. The local terminal then maps the pattern onto the image. This document requires that the pattern is repetitive. Furthermore, the catalogue appears to be stored locally to the terminal. This means that the catalogue is limited by the capacity and performance of the local terminal. Accordingly, the mapping of the pattern onto the image is all performed locally with the corresponding disadvantages as set out above.

BRIEF SUMMARY OF THE INVENTION

In a first aspect of this invention there is provided a method for producing a colour recommendation for a structure or part of a structure to be painted which comprises as shown in FIG. 1 the steps of selecting, at a user terminal (UT) and from a first database (DB1) containing at least one image of structural archetypes stored in electronic format on storage means, an archetype image that closely matches the structure to be painted, the first database (DB1) being located at a server (SERVER) remote from the said user terminal selecting, at the said user terminal (UT), a colour or colours from a second database (DB2) containing at least one colour stored in electronic format on storage means the second database likewise being located at the remote server (SERVER) applying the colour or colours at the remote server to the image to produce a colour scheme displaying, on a display unit (DU) of the user terminal (UT), the structure or part of a structure with the colour applied and providing information from which paint corresponding to the colour or colours in the colour scheme can be identified.

In a further aspect of this invention there is provided a method for producing a colour recommendation for a structure or part of a structure to be painted comprising the steps of selecting from a first database containing at least one image of structural archetypes stored in electronic format on optical storage means, an archetype image that closely matches the structure to be painted; selecting a colour or colours from a second database containing at least one colour stored in electronic format on an optical storage means; applying, at a user terminal, the colour or colours, obtained from the optical storage means, to the image to produce a colour scheme; displaying the structure or part of a structure with the colour applied; and providing information from which paint corresponding to the colour or colours in the colour scheme can be identified.

In a third aspect there is provided by this invention a system for producing a colour recommendation for a structure or part of a structure to be painted that as shown in FIG. 2 comprises: a first database (DB1) located at a server (SERVER) remote from a user terminal containing at least one image of structural archetypes stored in electronic format on storage means; a second database (DB2) located at the server (SERVER) remote from the user terminal (UT) containing at least one colour stored in electronic format on storage means; applying means (A1) located within the server to apply at least one colour to said image to produce a colour scheme; and display means (DU) located at the user to display the structure or part of the structure with the colour applied; and said display means being arranged in use further to provide information from which paint corresponding to the colour or colours in the colour scheme can be identified.

In a fourth aspect of this invention there is provided A system for producing a colour recommendation for a structure or part of a structure to be painted that as shown in FIG. 3 comprises: a first database (DB1) containing at least one image of a structural archetype stored in electronic format on optical storage means; a second database (DB2) containing at least one colour stored in electronic format on optical storage means; applying means (A1) located at a user terminal (UT) for applying the at least one colour, obtained from said optical storage means, to the image to produce a colour scheme; and display means (DU) for displaying the structure or part of the structure with the colour applied; the display means being arranged in use further to provide information from which paint corresponding to the colour or colours in the colour scheme can be identified.

DETAILED DESCRIPTION OF THE INVENTION

Figure 1:
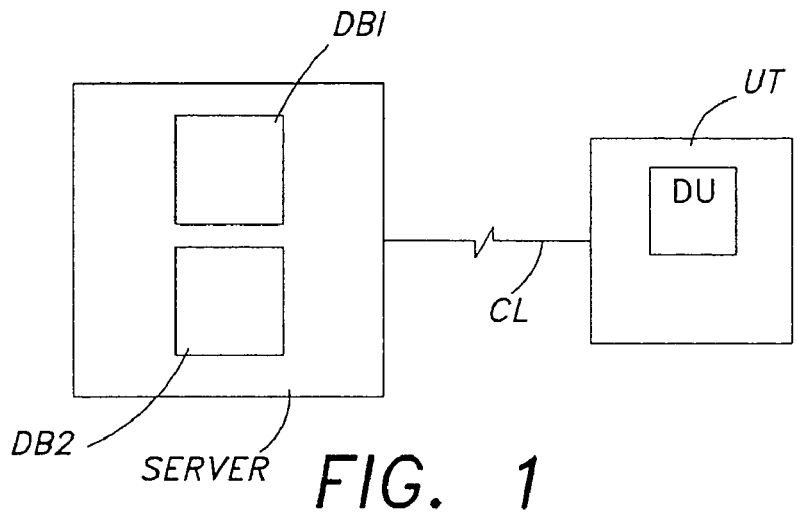
FIG. 1, is a schematic diagram of the process and system of an embodiment of the present invention.
Figure 2:
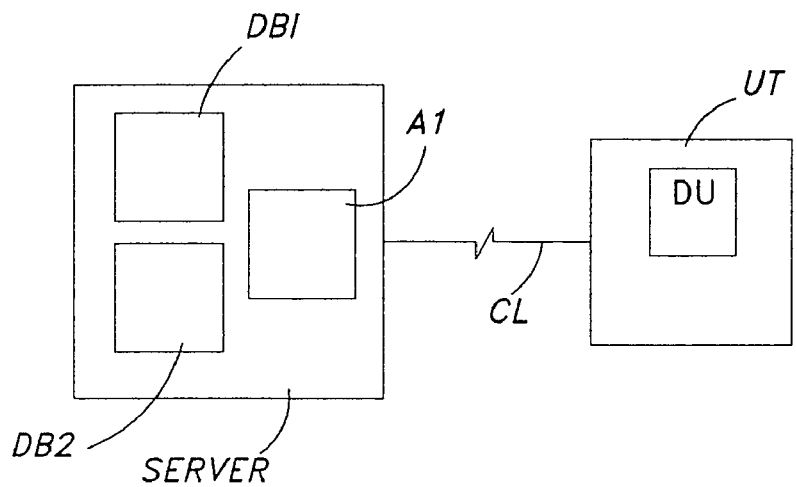
FIG. 2, is a schematic diagram of the process and system of another embodiment of the present invention.
Figure 3:
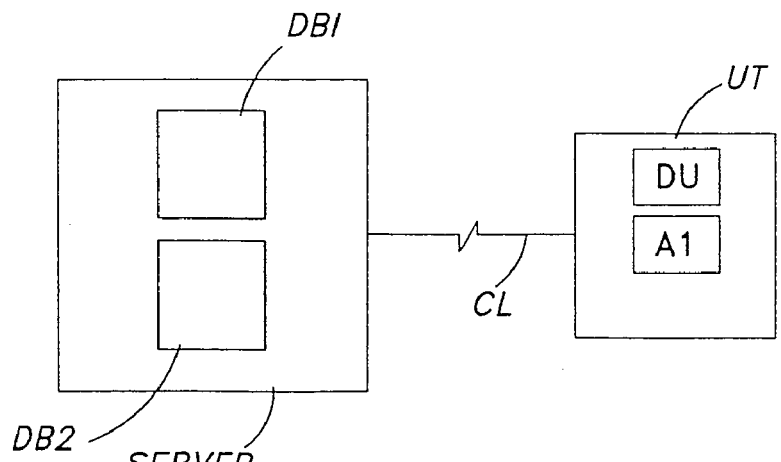
FIG. 3, is a schematic diagram of the process and system of still another embodiment of the present invention.

By a structural archetype is meant an image of a structure or part of a structure that is representative of a particular design or style of architecture or design or style of architecture that is common or popular. Preferably there are sufficient archetypes in the database such that the user can choose one that has some resemblance to the structure he wishes to decorate. This is advantageous for the user because constructing an identical room to the one requiring decorating, by inserting furniture and the like, can be laborious. It is therefore beneficial for the user to see a hi-resolution (for example), realistic image that broadly resembles their own room rather than inserting features, to make the image identical to their own room. The database of structural archetypes might therefore contain many styles of room, one of which may be selected by a user.

In particular the structural archetypes can be images of a building. In particular the images can be of the exterior of a house for example the front elevation showing a front wall with front windows a front door and a roof, or a diagonal view showing the front and one side in elevation or a rear elevation, or a diagonal view showing a side and rear elevation.

The structural archetype can be an image of the interior of a house, for example a bedroom, a bathroom, a kitchen, a living room, a dining room or hall.

Preferably the database contains a number of archetypes in different structural styles. For example the exterior can be in the Tudor, Gothic, Edwardian or a modern style.

Similarly the interior can be in a classic or modern style.

In particular separate areas on the archetype can be coloured separately one from another. For example the separate areas can be walls, doors, coving, ceilings, dado rails, skirting boards, window frames, window sills or fireplaces. Where the part of a structure is a room, it may also contain furniture or furnishings such as curtains, carpets, sanitary ware, chairs and sofas on which there can be covers and cushions.

In a preferred embodiment colour can be applied separately to the structure or part of the structure and to the furniture and furnishings.

Preferably the images are of photographic quality.

With regard to the database containing colours, the colours can be grouped alphabetically by colour name or assembled in groups where the colours are complimentary or contrasting one with another.

The database containing the archetype images and the colours are stored on a storage means for storing data on a storage medium. Examples of suitable storage means include magnetic disks such as the hard disk of a personal computer or a so called floppy disk; and optical disks such as compact disks.

The rendering of the colours onto the structural images may be carried out remotely or locally to a user terminal.

Access to the database can be remote for example via communication lines (CL) such as a local or wide area network. In a preferred embodiment of this invention remote access is via the Internet. This is advantageous because the size of the database is not limited by the capacity of the local terminal. This means that the database can expand in size as the available product ranges expand. Furthermore, updating the database is quicker and can be undertaken more frequently as only the server storing the database has to be updated as opposed to each individual local terminal. This also ensures that each potential consumer has access to the same products. This means that each user can access new product items, which may be more suitable.

It is further preferred that when the database is accessed remotely, the rendering of the colours onto the highlighted structural archetypes is performed remotely. The rendered image may then be downloaded onto the local terminal. This is advantageous over rendering the colours onto the image locally because the rendering requires a large amount of local terminal resources. This may result in the local terminal slowing down and not performing as expected.

The user can indicate the selection made by, for example, clicking a mouse button, touching the screen or using voice activation.

The colour scheme produced by this method can be printed out as a photographic quality print or as a message specifying the colour by name or other indicator and the source from which it can be purchased or a combination thereof.

In particular also where there is remote access to the database the user access point can include means to supply an image of the structure or structural component to be coloured on a suitable storage means. Examples of suitable storage means include floppy disks and compact disks.

The invention will now be described with reference to the following embodiments.

EMBODIMENT 1

The database containing the images of the structural archetypes is stored on the hard disk of a personal computer. The database containing the colours, their names and other reference information relating to them is also stored on the same hard disk. Using a combination of images and written words displayed on a touch sensitive screen the user is invited to select from a number of different interior and exterior structural archetypes, the structural archetype to be painted by touching the screen. The structural archetype selected is displayed on the screen with the available choice of colours accessed by touching the screen. The user selects the colour on the screen. The computer fills in the area of the image with the chosen colour and displays it. The user may print the screen image of the structural archetype, including any other information relating to the colour or colours selected, on the photographic quality printer connected to the computer.

EMBODIMENT 2

The method of Embodiment 1 is followed except that the databases for the structural archetypes and the colours are stored on a compact disk.

EMBODIMENT 3

The method of Embodiment 1 is followed except that the user provides the image of the structure to be painted in a format capable of being inputted to the computer.

EMBODIMENT 4

The method of Embodiment 1 is followed except, the database of structural archetypes and the database of colours is stored at the remote server as opposed to local storage on a hard disk of a personal computer. A user may access either one or both of the databases located at the server by using a local terminal. The local terminal and the server are connected by a communication link. The user chooses a particular archetype from the structural archetype database using the terminal; the chosen archetype is then downloaded and displayed at the local terminal. The user can then highlight an area to be filled with a colour. Once the area has been highlighted, the user can then choose a colour from the remotely stored colour database. Details of the chosen colour, preferably the Red/Green/Blue properties, are then used by the remote server to render the colour onto the highlighted area. The software used during rendering provides relevant shading and perspective to the rendered image. As this software is known in the art, it shall not be discussed any further here. The rendered image is then downloaded from the server to the local terminal for display thereon. The user may then print the image, preferably using a photographic quality printer or may store the image electronically, onto a suitable medium for example a floppy disk, or onto an optical medium for example a compact disk. It is understood however that the image may be stored locally at the user terminal or may be sent to an email address as an attachment for viewing elsewhere. It is noted that the description relates to a single local terminal, in reality however, there may be a plurality of such terminals in communication with a single server.

The invention claimed is:

1. A method for producing a colour recommendation for a structure or part of a structure to be painted which comprises the steps of:
   a) selecting, at a user terminal and from a first database containing at least one image of structural archetypes stored in electronic format on storage means, an archetype image that closely matches the structure to be painted, the first database being located at a server remote from the said user terminal;
   b) selecting, at the said user terminal, a colour or colours from a second database containing at least one colour stored in electronic format on storage means the second database likewise being located at the remote server;
   c) applying the colour or colours at the remote server to the image to produce a colour scheme;
   d) displaying, on a display unit of the user terminal, the structure or part of a structure with the colour applied; and
   e) providing information from which paint corresponding to the colour or colours in the colour scheme can be identified.

2. A method according to claim 1, where the user terminal is connectable to the remote server via a communication link.

3. A method according to claim 2, where said communication link is a wide area network.

4. A method according to claim 2, where said communication link is a local area network.

5. A method according to claim 2, where said communication link is the internet.

6. A method according to claim 1, where the structural archetypes are images of a building.

7. A method claimed of claim 6, where the building is a house.

8. A method according to claim 1, where the image is of the interior of a building.

9. A method according to claim 1, where separate areas of the archetypes can be coloured separately one from another.

10. A method according to claim 9, where the archetype is an interior of a building and the separate areas are walls, doors, coving, ceiling, dado rails, skirting boards, window frames, sills and fireplaces.

11. A method according to claim 1, where the archetype is an interior of a building and also contains furniture or furnishings.

12. A method according to claim 11 where colour can be applied separately to the furniture or furnishings.

13. A method according to claim 1, where images are of photographic quality.

14. A method according to claim 1, where the colours are assembled in groups where the colours are complementing or contrasting with one another.

15. A method according to claim 1, where the user can enter from his point of access, the image to be coloured in electronic form.

16. A method according to claim 1, wherein the colours are assembled in the second database by colour names.

17. A method according to claim 1, wherein the colours are assembled in the second database by Red/Green/Blue properties.

18. A method according to claim 1, wherein the structural archetypes in the first database include archetype images of at least a part of a structure of the exterior of a building, a motor vehicle, mobile home or ship.

19. A method according to claim 18, wherein the archetype images of the exterior of a building include at least one of the front elevation showing a front wall with front windows a front door and a roof, or a diagonal view showing the front and one side in elevation or a rear elevation, or a diagonal view showing a side and rear elevation.

20. A method according to claim 1, wherein the structural archetypes in the first database include archetype images for the at least part of a structure of the exterior and of the interior of a building of a number of archetypes in different structural styles.

21. A method according to claim 20, wherein the archetype images for the exterior of a building include those selected from the group of Tudor, Gothic, Edwardian and modern style and the archetype images for the interior of a building are selected from a classic or modern style.

22. A method for producing a colour recommendation for a structure or part of a structure to be painted comprising the steps of:
   a) selecting from a first database containing at least one image of structural archetypes stored in electronic format on optical storage means, an archetype image that closely matches the structure to be painted;
   b) selecting a colour or colours from a second database containing at least one colour stored in electronic format on an optical storage means and applying, at a user terminal, the colour or colours obtained from the optical storage means, to the image to produce a colour scheme;
   c) displaying the structure or part of a structure with the colour applied; and
   d) providing information from which paint corresponding to the colour or colours in the colour scheme can be identified.

23. A method according to claim 22, where the structural archetypes are images of a building.

24. A method according to claim 22, where the image is of the interior of a building.

25. A method according to claim 22, where separate areas of the archetypes can be coloured separately one from another.

26. A method according to claim 22, where the archetype is an interior of a building and also contains furniture or furnishings.

27. A method according to claim 22, where images are of photographic quality.

28. A method according to claim 22, where the user can enter from his point of access, the image to be coloured in electronic form.

29. A system for producing a colour recommendation for a structure or part of a structure to be painted that comprises:
   a first database located at a server remote from a user terminal containing at least one image of structural archetypes stored in electronic format on storage means;
   a second database located at the server remote from the user terminal containing at least one colour stored in electronic format on storage means;
   applying means located within the server to apply at least one colour to said image to produce a colour scheme; and
   display means located at the user to display the structure or part of the structure with the colour applied; and said display means being arranged in use to provide information from which paint corresponding to the colour or colours in the colour scheme can be identified.

30. A system for producing a colour recommendation for a structure or part of a structure to be painted that comprises:
   a first database containing at least one image of structural archetype stored in electronic format on optical storage means;
   a second database containing at least one colour stored in electronic format on optical storage means;
   applying means located at a user terminal for applying the at least one colour, obtained from said optical storage means, to the image to produce a colour scheme; and
   display means for displaying the structure or part of the structure with the colour applied;
   the display means being arranged in use further to provide information from which paint corresponding to the colour or colours in the colour scheme can be identified.

* * * * *